Feb. 19, 1952 W. H. ROOKSBY ET AL 2,586,481
METHOD OF AND APPARATUS FOR CORRUGATING
ASBESTOS-CEMENT SHEETS
Filed June 1, 1946 6 Sheets-Sheet 1
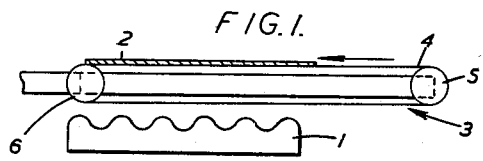
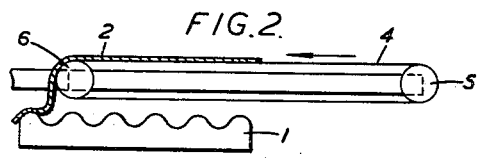
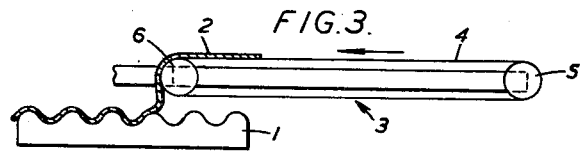
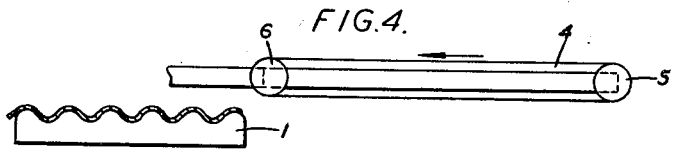
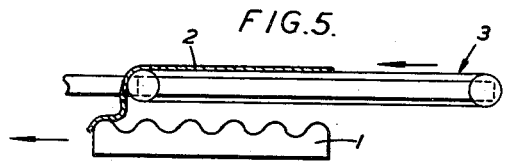
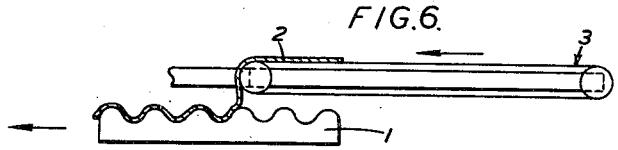
INVENTORS
WILLIAM H. ROOKSBY,
HERBERT HOMER, AND
THOMAS BURGESS
BY Thomas E. Scofield,
Attorney.

INVENTORS
WILLIAM H. ROOKSBY,
HERBERT HOMER, AND
THOMAS BURGESS

BY *Thomas E. Scofield*

Attorneys.

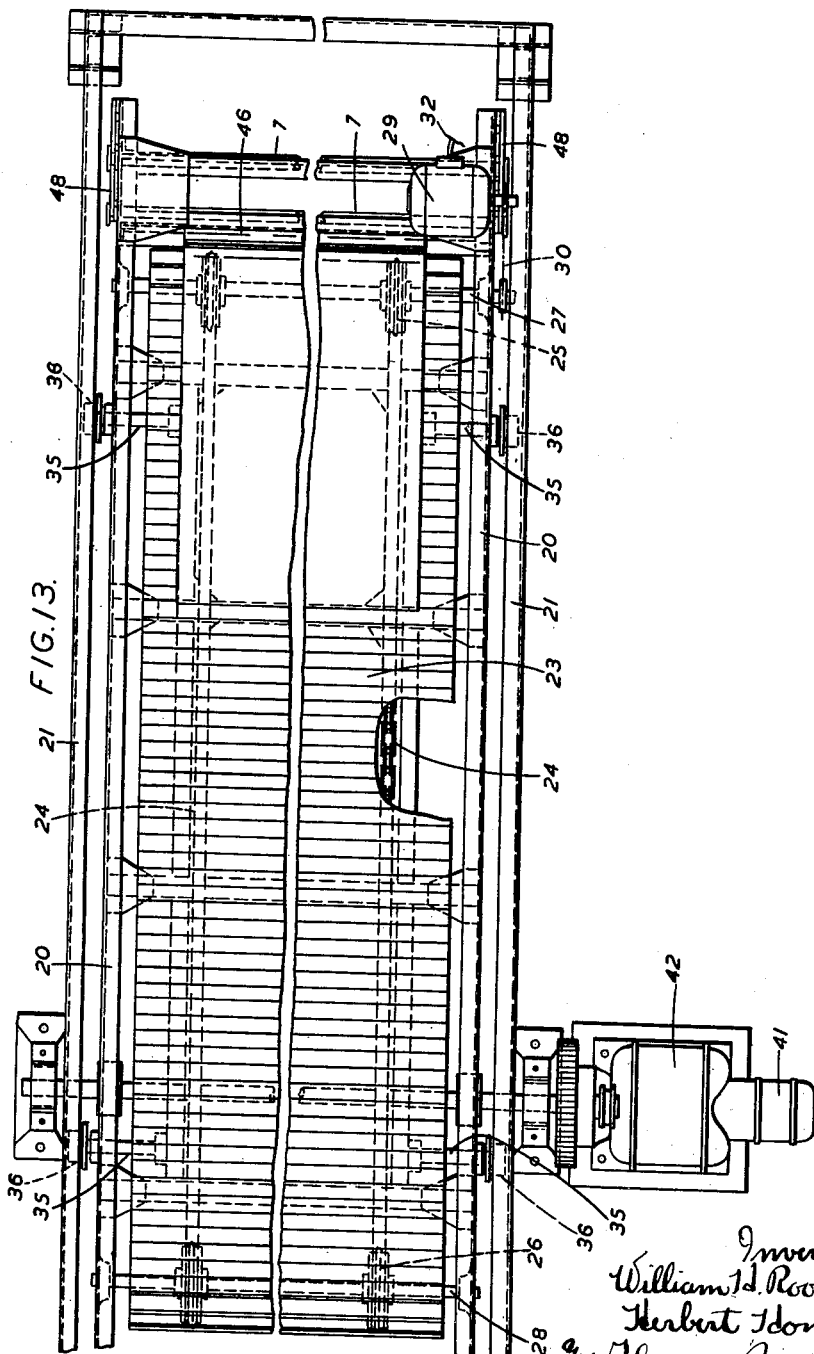

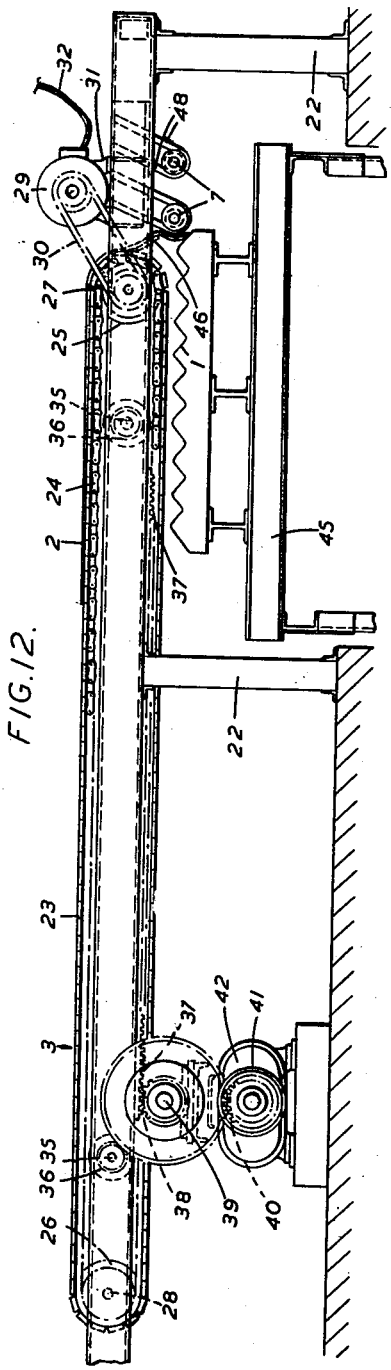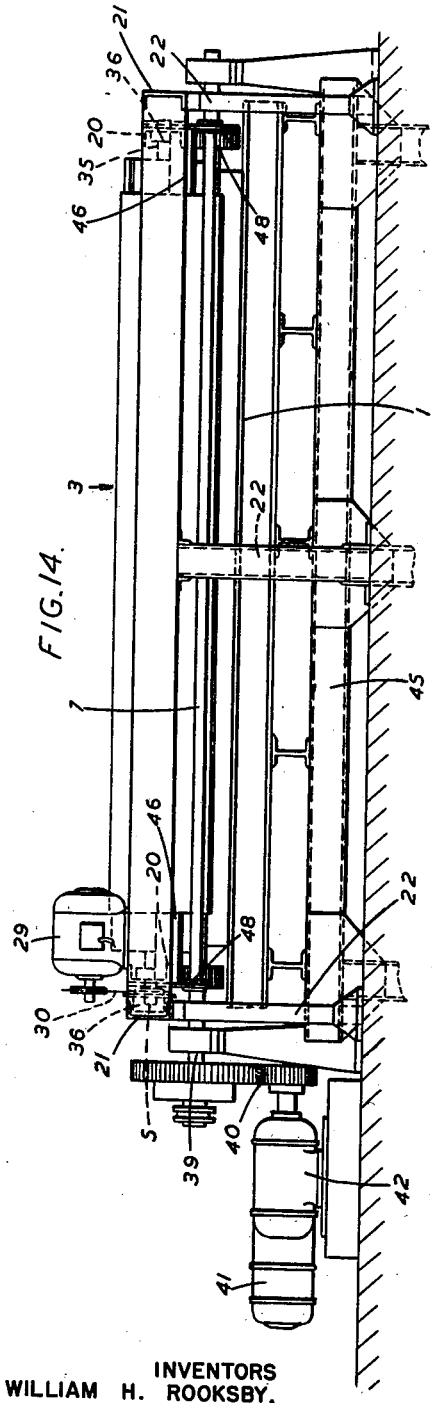

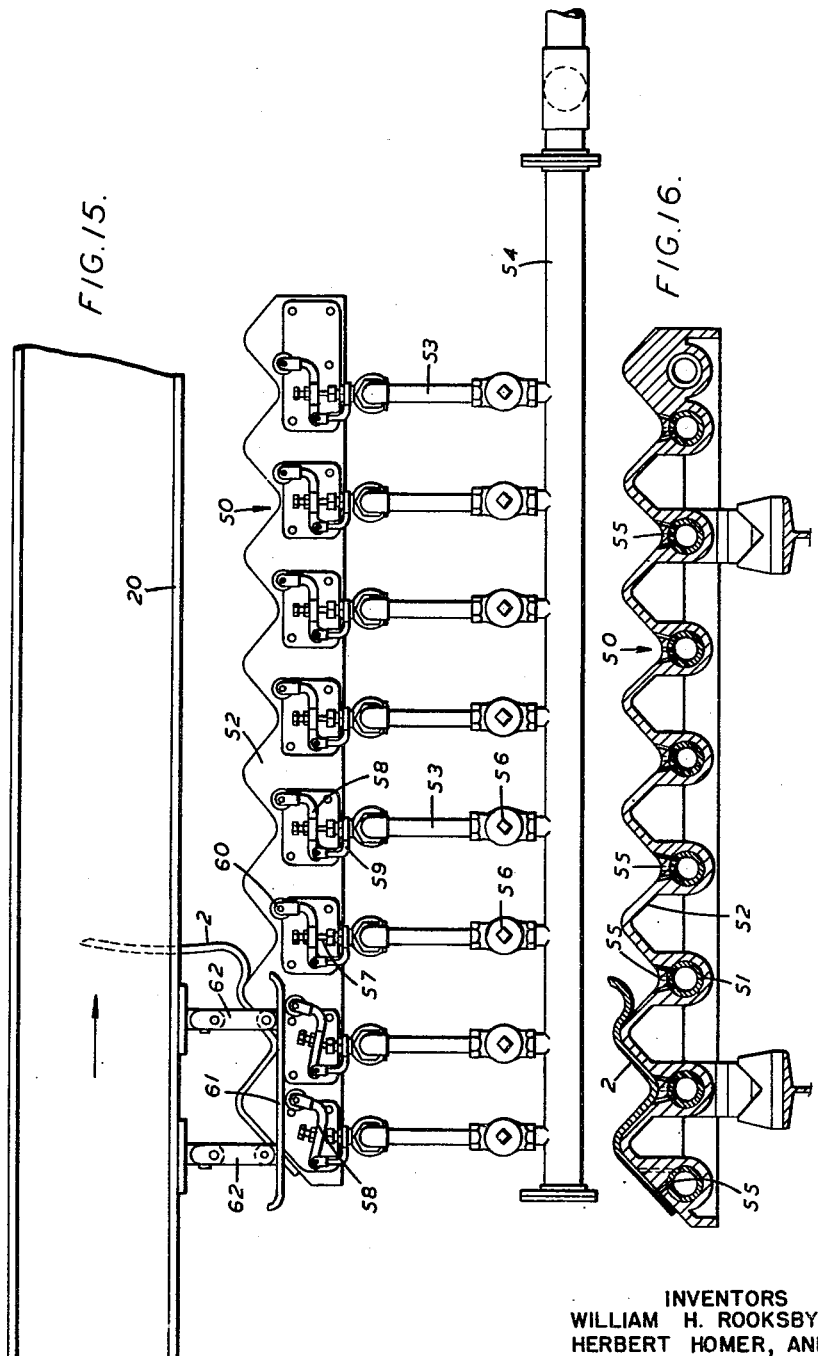

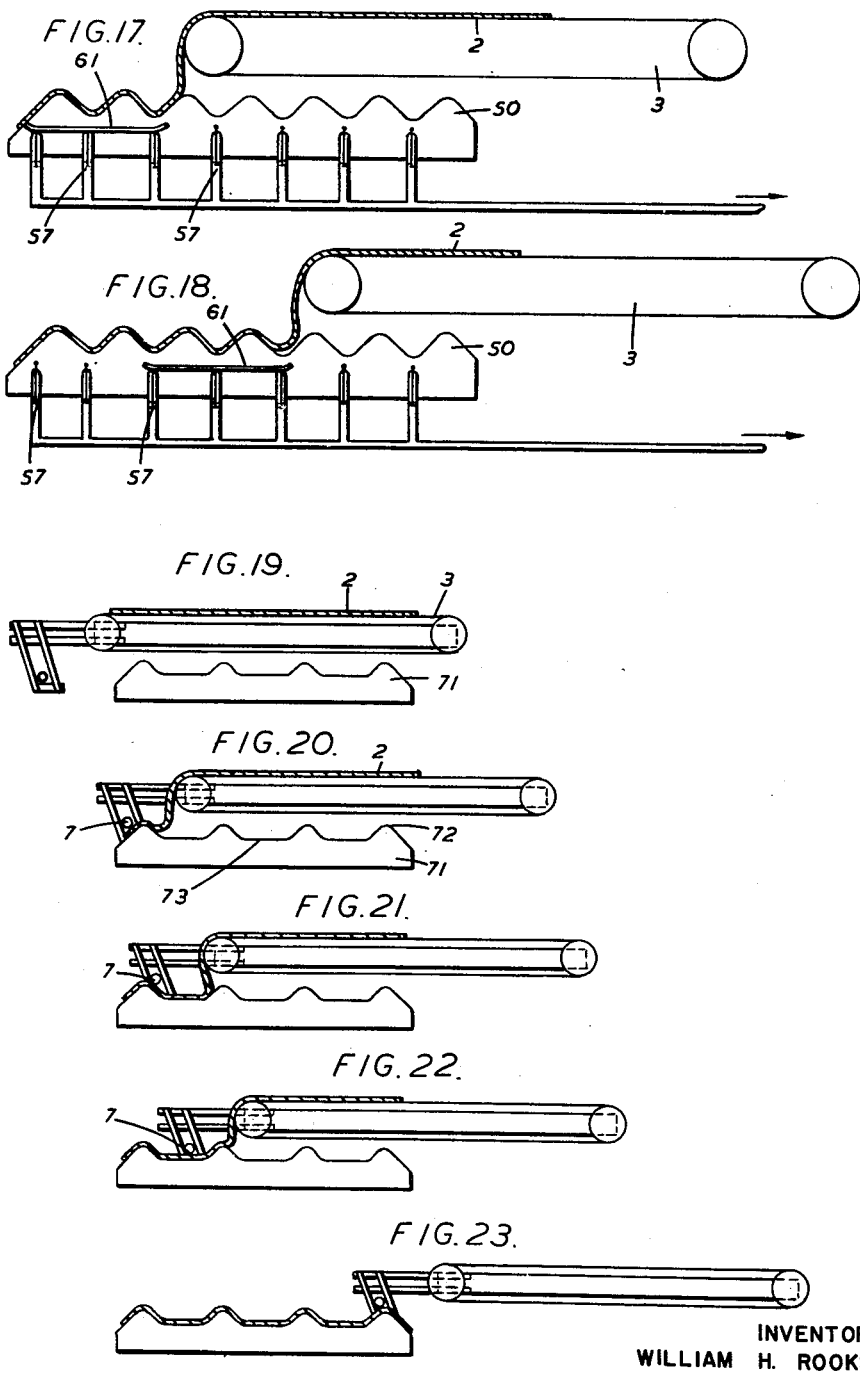

Patented Feb. 19, 1952

2,586,481

UNITED STATES PATENT OFFICE 2,586,481

METHOD OF AND APPARATUS FOR CORRUGATING ASBESTOS-CEMENT SHEETS

William Holdsworth Rooksby and Herbert Homer, Trafford Park, Manchester, and Thomas Burgess, Dartford, England, assignors to Turners Asbestos Cement Company Limited, Spotland, Rochdale, England, a British company Application June 1, 1946, Serial No. 673,790
In Great Britain June 8, 1945

13 Claims. (Cl. 25—42)

1

Corrugated asbestos-cement or like sheets made from fibres and a binder are usually made by putting a sheet of the asbestos-cement, while still in the wet or plastic state, on a corrugated former and making it take the shape of the former. This is done either by the use of a counterpart plate in a press or by using rollers or rods to force the material of the sheet into the recesses or valleys of the former. In either case the material tends to stretch while being corrugated. Thus when rods are used, the flat sheet is generally wound round a pole and carried to a corrugated former on which it is laid and then a rod is put on it over the central trough or valley and pushed downwards. The material on each side is drawn towards the centre. Next a rod is similarly forced down into the trough or valley on each side of the central one and the remaining flat material is again drawn in towards the centre. Each time some of the material is subjected to tension and the result is that the final sheet is liable to be weakened. The use of a counterpart plate similarly weakens the sheet. This weakening is inevitable because of the nature of asbestos-cement, which will only develop its full strength if the fibres are left undisturbed after the formation of the sheet. Quite apart from this weakening, each of the existing methods either slows down the output or necessitates duplication of apparatus or operators to maintain the output. Moreover, the winding of the sheet round a pole roughens its surface and so somewhat spoils its appearance.

An object of this invention is to corrugate a plastic sheet without damaging it.

Another object is to provide a method by which plastic sheets may be corrugated without being handled.

A further object is to provide an improved apparatus for corrugating asbestos-cement sheets.

Broadly stated, in this invention a plastic sheet is fed over a discharge edge onto a corrugated former in such a way that it laps without tension onto and substantially conforms with the surface of the former as a result of the development of slack in the sheet between the discharge edge and the surface of the former. In other words, the sheet is allowed to lay itself naturally and without the application of pressure onto the surface of the former. The term "corrugated former" is used in this specification to mean any former having a surface which is corrugated in regular or irregular fashion about axes transverse to the direction of relative movement and which may

2 have one or more flat parts in addition to one or more corrugated parts.

To cause the sheet to lap in the desired manner there must be relative movement between the discharge edge and the former and all the speeds of movement must be so correlated that (assuming the former is stationary and the discharge edge is travelling while the sheet passes over it) the discharge edge must travel over a part of the former having a corrugated length equal to the length of the sheet in the time taken for the delivery of the sheet. By "corrugated length" we mean the length measured up and down each corrugation and along any flat parts in the part of the former in question. In other words, while the discharge edge is passing over the former (or so much of it as is to be covered by the sheet) a length of sheet equal to the corrugated length of the former (or that part which is to be covered) is delivered over the discharge edge.

We prefer to make the discharge edge the end of an endless conveyor. This will be better understood by reference to the accompanying drawings, in which:

Figures 1 to 4 are diagrams illustrating successive stages in the lapping operation during the formation of a uniformly corrugated sheet;

Figures 5 and 6 are similar diagrams illustrating two stages in another method of operation;

Figures 12, 13 and 14 are a side elevation, a plan and an end elevation respectively of one apparatus constructed to work on the principle illustrated by Figures 7 to 11;

Figure 15 is a side elevation of part of a modified apparatus;

Figure 16 is a section through the apparatus shown in Figure 15;

Figures 17 and 18 are diagrams illustrating the operation of the apparatus shown in Figures 15 and 16; and Figures 19 to 23 are diagrams similar to Figures 7 to 11 but showing another kind of corrugated former.

Figure 7:
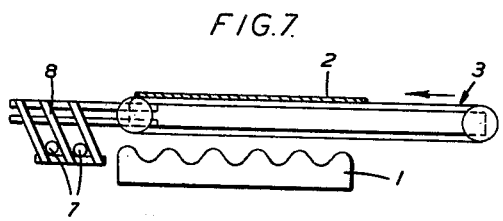
Figures 7 to 11 are similar diagrams illustrating five stages in a third method of operation.

Referring first to Figures 1 to 4, a uniformly corrugated former 1 is used. A flat plastic sheet 2 of asbestos-cement is carried by a conveyor 3 comprising an endless band 4 passing around rollers 5 and 6, the conveyor being mounted to move as a whole above the former 1.

At the moment when the discharge of the sheet from the conveyor is to begin the discharge end of the conveyor 3 is just above one end of the former 1 and the body of the former lies beneath the conveyor, as shown in Figure 1. As the discharge continues the conveyor moves over the former to the right while the upper run of the band 4 travels towards the left. The speed of the upper run of the band 3 in the discharge or leftwise direction must be greater than that of the conveyor frame in the reverse direction. The result is that the sheet 2 is delivered over the discharge edge of the conveyor in the manner illustrated by Figures 2 and 3. The relative speeds of the upper run of the conveyor band in the one direction and the complete conveyor in the other direction must be such that as the rearward end of the sheet is discharged the discharge edge of the conveyor lies above the other end of the former, as shown by Figure 4.

During the operation the part of the sheet which is actually passing from the conveyor to the former develops some slack, as shown in Figures 2 and 3, and this slack part on reaching the former laps itself onto the corrugated surface.

If it is inconvenient to use a conveyor having a frame capable of linear movement as a whole, the former may be moved. As before, the end of the former onto which the sheet is first delivered must initially lie beneath the discharge edge of the conveyor, i. e. in the position shown in Figure 1, and as the delivery of the sheet proceeds the former must move out from beneath the conveyor at the appropriate speed, in the manner illustrated by Figures 5 and 6.

The speed at which the operation proceeds plays a part in determining the closeness with which the sheet makes contact with the surface of the former. If the conveyor band 4 travels slowly (and the frame likewise moves backwards slowly) the sheet will make close contact with the surface of the former as a result of the lapping alone. At higher speeds, however, such as are desirable in order to increase the output of a complete plant, say conveyor band speeds of 40 feet per minute or more, the sheet will conform generally to the shape of the former but will not make uniform close contact with its surface. Accordingly we prefer either to subject the sheet while it is on the former to smoothing pressure from above in order to bring it into uniform close contact with the surface of the former or to make the former the perforated top of a suction box and to apply vacuum for the same purpose, or to employ both these methods. This pressure or vacuum may advantageously be applied to each part of the sheet immediately after it has lapped onto the former, that is to say, as the lapping continues the part of the sheet already on the former is subjected to smoothing pressure from above or vacuum from below to hold it in position while a further part of the sheet is lapping onto the surface.

Figure 8:
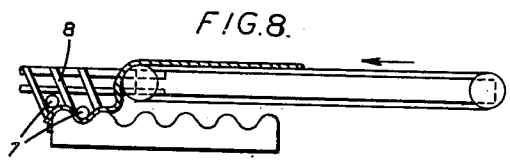
Figure 9:
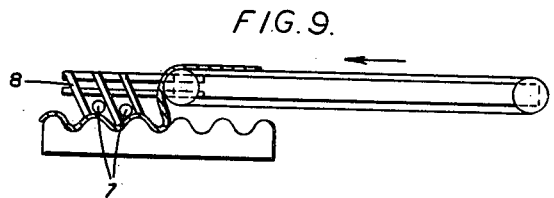
Figure 10:
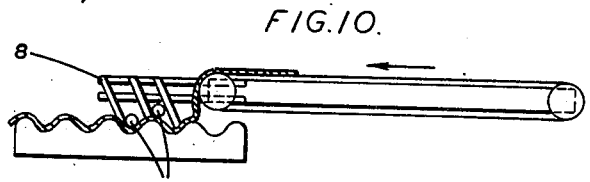
Figure 11:
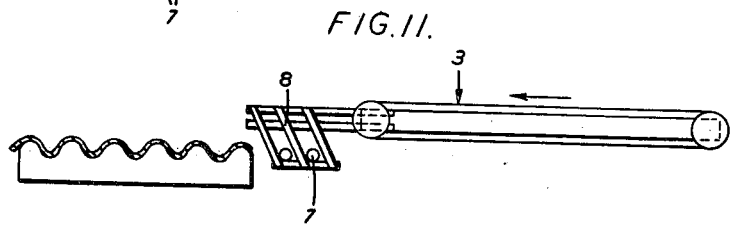

Figures 7 to 11 show how smoothing pressure may be applied by rollers 7 carried by and free to rise and fall in a cage 8 between which and the former there is relative longitudinal movement. As shown in these figures the cage 8 is carried by the frame of the conveyor 3 so that it moves bodily with the conveyor. As each part of the sheet 2 laps onto the surface of the former the rollers 7 ride over the surface and not only exert smoothing pressure but also hold the sheet firmly down while the next part is being fed.

Figures 12 to 14 show an apparatus working on the principle illustrated by Figures 7 to 11. This forms part of a complete plant for the manufacture of asbestos-cement sheets, the whole plant preferably being constructed as described in application No. 673,793 of even date herewith and including a making machine of the Hatschek type. The sheets made in this plant are delivered one by one by a conveyor (not shown) and without being handled to the surface of an endless band conveyor 3 which is carried in a rectangular frame 20 mounted to move bodily as a whole on fixed horizontal frame members 21 carried by supports 22. The conveyor band is built up from slats 23 secured to endless chains 24 passing around chain wheels 25 and 26 carried by shafts 27 and 28 respectively. The resultant slatted band is driven by an electric motor 29 connected by a chain 30 to the shaft 27, the motor being carried by a bracket 31 fixed to the frame 20 so that it moves as a whole with the frame when the latter reciprocates. The motor is fed with current through flexible leads 32 which may conveniently be suspended above the apparatus.

The frame 20 is furnished with lateral spindles 35 carrying rollers 36 which run in the frame members 21. The frame 20 is actually reciprocated through a rack-and-pinion mechanism, the rack teeth 37 being formed on the undersides of the side members of the frame and being engaged by pinions 38 carried by a shaft 39 which is intermittently driven by an electric motor 41 through gearing 40 and a variable gear 42. This motor 41 is of the reversing type and controls are provided to drive it alternately in opposite directions at a predetermined speed, the motor being stopped at the end of each run by means of limit switches not shown. It will readily be understood that the speeds of the two motors and the gear ratios are made such as to fulfil the conditions set forth above for automatic lapping of the sheets onto the formers, the gear 42 being adjusted in accordance with the particular type of former in use.

The corrugated former 1 is carried by a fixed frame 45 placed so that the discharge end of the conveyor 3, namely the end at which the shaft 27 is placed, moves over the former during each reciprocation of the conveyor. To guide the sheet from the discharge end of the conveyor onto the surface of the former an inclined plate 46 is mounted in the frame 20, its upper edge coming nearly into contact with the slatted band as the latter turns downwards. Rollers 7 for applying smoothing pressure are carried in cages formed by inclined U-shaped brackets 48 fixed to the frame 20, there being one such bracket at each side of the frame for each roller.

Although reference has been made to an endless conveyor and the slatted band shown is itself endless, it is not in fact necessary for the slats to be continuously arranged on the chains provided that the conveyor is automatically driven and stopped so that the same part of it always comes into position to receive a fresh plastic sheet. In such a case slats need be provided only over that particular part.

When vacuum is used to bring the sheet into close contact with the corrugated surface, this may be made the top of a suction unit 50, as shown in Figures 15 and 16. This unit 50 comprises a series of pipes 51 encased in a corrugated casting 52. The pipes 51 are all connected through pipes 53 to a common suction pipe 54 which is connected to a suction pump (not shown). Holes 55 are drilled through the bottoms of the troughs of the corrugations and the pipes beneath them and also through the end wall of the first corrugation, so that suction can be applied to the plastic sheet close to the edge first applied to the former and along the bottom of each trough.

Each pipe 53 is furnished not only with a manual control valve 56 but also with a mechanically actuated valve 57 which normally closes onto a valve seat in each pipe and so cuts off the suction from the holes 55. Each valve 57 is opened when a rocking lever 58 pivotally mounted at one end on a bracket 59 and carrying a roller 60 at the other end is rocked clockwise as seen in Figure 15. The rocking is effected by a shoe 61 carried by brackets 62 on the underside of the frame 20 of the conveyor. As this frame moves rearwardly and each sheet 2 laps onto the former, the shoe puts the pipes 51 successively under vacuum. This operation is illustrated by Figures 17 and 18. It will be seen that the shoe 61 serves to apply vacuum to a maximum of three pipes 51 at a time, that is to say, before vacuum is applied to the fourth pipe 51 the first pipe is allowed to return to atmospheric pressure and so on, but of course the shoe may be of appropriate length to maintain the vacuum in any number of pipes until the sheet has been wholly lapped into position if desired.

In such a combined suction unit and former, the holes 53 may, for example, be $\frac{1}{16}$ of an inch in diameter and 1 inch apart from one another. Naturally, however, the size, number and disposition of the holes can be varied considerably, and they may be placed in the crests or sides as well as in the troughs of the corrugations.

Rollers or vacuum may also be used with advantage when the shape of the former is such that the sheet will not readily take up the exact contour of the former, even though its two ends coincide with those of the former and its body has been properly distributed over the length of the former by the method described. This is illustrated by Figures 19 to 23 which show a former 71 with corrugations 72 separated by flat parts 73 and a roller 7 for exerting the desired smooth pressure. As will be seen, particularly from Figure 20, the sheet tends to develop an excess of slack as the discharge edge of the conveyor 3 moves over the flat parts of the former and this excess is to a large extent taken up automatically as the discharge edge moves over each corrugation.

In addition to reducing the risk of damage to the sheets, the advantage is obtained that the surfaces of the sheets are not roughened and so they are better in appearance than the sheets made by the existing methods.

We claim:

1. Apparatus for corrugating a plastic sheet comprising an endless conveyor for the sheet adapted to feed the sheet over one end thereof, a corrugated form under said one end to receive the sheet, means for progressively changing the position of said one end of the conveyor relative the surface of the form during said feeding of the sheet whereby the sheet is deposited progressively along the upper surface of the form, and means having a fixed position relative said one end of the conveyor operated to apply pressure temporarily to each portion of the sheet as soon as that portion reaches the form thereby to urge said portion against the form.

2. Apparatus for corrugating a plastic sheet comprising an endless conveyor for the sheet adapted to feed the sheet over one end thereof, a corrugated form under said one end to receive the sheet, means for progressively changing the position of said one end of the conveyor relative the surface of the form during said feeding of the sheet whereby the sheet is deposited progressively along the upper surface of the form, cages having a fixed position relative said one end of the conveyor, rollers loosely confined by the cages for limited vertical movement, the rollers resting on the deposited sheet and adapted to roll over same as said form moves relative said one end of the conveyor.

3. Apparatus for corrugating a plastic sheet comprising an endless conveyor for the sheet adapted to feed the sheet over one end thereof, a corrugated form under said one end to receive the sheets, means for progressively changing the position of said one end of the conveyor relative the surface of the form during said feeding of the sheet whereby the sheet is deposited progressively along the upper surface of the form, the troughs in the corrugated form having apertured bottoms, a suction line, and valve means actuated by said first means for connecting said line to the apertures.

4. Apparatus for corrugating a plastic sheet comprising an endless conveyor for the sheet adapted to feed the sheet over one end thereof, a corrugated form under said one end to receive the sheet, means for progressively changing the position of said one end of the conveyor relative the surface of the form during said feeding of the sheet whereby the sheet is deposited progressively along the upper surface of the form, the troughs in the corrugated form having apertured bottoms, a suction line common to the apertures in all troughs, valve means to selectively connect said line to any one of said troughs, and a selector actuated by said first means for controlling said valve means to connect said line to the apertures of different troughs successively in such timed relation to the operation of said first means that said line is connected temporarily to the apertures in each trough as the sheet covers that trough.

5. Apparatus for corrugating a plastic sheet, comprising an endless conveyor for the sheet adapted to feed the sheet over one end thereof, a corrugated form under said one end to receive the sheet, means for progressively changing the position of said one end of the conveyor relative the surface of the form during the feeding of the sheet whereby the sheet is deposited progressively along the upper surface of the form, the troughs in the corrugated form having apertured bottoms, a suction line having a plurality of branches communicating respectively with the apertures in the different troughs, a valve in each branch between the suction line and said apertures, and means synchronized with the changing position of said one end of the conveyor relative to the surface of the form for operating said valves successively.

6. Apparatus for corrugating a plastic sheet, comprising an endless conveyor for the sheet adapted to feed the sheet over one end thereof, a corrugated form under said one end to receive the sheet, means for progressively changing the position of said one end of the conveyor relative the surface of the form during said feeding of the sheet whereby the sheet is deposited progressively along the upper surface of the form, the troughs in the corrugated form having apertured bottoms, a plurality of ducts disposed side by side below the corrugated form, each duct aligned with one of the troughs and communicating with the apertures in the bottom of that trough, suction means connected to each duct, a valve in each duct between the suction means and the apertures communicating with that duct, and means for operating said valves successively.

7. Apparatus for corrugating a plastic sheet comprising an endless conveyor for the sheet adapted to feed the sheet over one end thereof, a corrugated form under said one end to receive the sheet, means for progressively changing the position of said one end of the conveyor relative the surface of the form during said feeding of the sheet whereby the sheet is deposited progressively along the upper surface of the form, the troughs in the corrugated form having apertured bottoms, a plurality of ducts disposed side by side below the corrugated form, each duct aligned with one of said troughs and communicating with the apertures in the bottom of that trough, suction means connected to each duct, a normally closed valve in each duct between the suction means and the apertures communicating with that duct, and an actuator controlled by said first means for opening said valves successively in predetermined timed relationship to the change in position of said one end of the conveyor relative the surface of the form.

8. Apparatus for corrugating a plastic sheet comprising a conveyor adapted to feed a sheet over an edge, a form beneath said edge having corrugations parallel to the edge, means for moving said edge relative to said form in a direction transverse to said corrugations, and means including an element having a fixed position relative to said edge for urging a portion of the sheet at a constant distance from said edge into uniform contact with said form.

9. Apparatus for corrugating a plastic sheet containing fiber and a binder which comprises supporting said sheet on a conveyor, operating said conveyor to feed said sheet at a predetermined rate over an edge onto a corrugated former, relatively moving said edge and said former at less than said predetermined rate in a direction transverse to the corrugations of said former, and temporarily subjecting each portion of said sheet as it is fed onto said former to the action of a vacuum within said former, said vacuum urging each successive portion of said sheet in turn into uniform contact with said former.

10. A method of corrugating a plastic sheet containing fiber and a binder which comprises supporting said sheet on a conveyor, operating said conveyor to feed the sheet at a predetermined rate over an edge onto a corrugated form, relatively moving said edge and said form at less than said pretermined rate in a direction transverse to the corrugations of the form, subjecting successive portions of the sheet, as each is fed in turn onto the form, temporarily to the action of a vacuum within the form thereby to draw each portion in turn toward the form, and subjecting the upper surface of the sheet to mechanical pressure also urging the sheet into uniform contact with the form.

11. A method of corrugating a plastic sheet containing fiber and a binder which comprises supporting said sheet on a conveyor, operating the conveyor to feed said sheet at a predetermined rate over an edge onto a corrugated form, relatively moving said edge and said form at less than said predetermined rate in a direction transverse to the corrugations of said form, and temporarily applying pressure on successive portions of said sheet as each portion in turn is fed onto the form thereby to urge said portions successively into uniform contact with the form.

12. Apparatus for corrugating a plastic sheet, comprising an endless conveyor for the sheet adapted to feed the sheet over one end thereof, a corrugated form under said one end to receive the sheet, means for progressively changing the position of said one end of the conveyor relative to the surface of the form during the feeding of the sheet whereby the sheet is deposited progressively along the upper surface of the form, the troughs in the corrugated form having apertured bottoms, a suction line common to the apertures in all troughs, valve means to selectively connect said line to the apertures in any one of said troughs, a selector actuated by said first means for controlling said valve means to connect said line to the apertures of each trough as the sheet covers that trough, a cage having a fixed position relative said one end of the conveyor, a roller loosely confined by the cage for limited vertical movement, said roller resting on the deposited sheet and adapted to roll over same as said form moves relative to said one end of the conveyor.

13. Apparatus for corrugating a plastic sheet, comprising a conveyor adapted to feed the sheet over an edge at a predetermined speed, a form beneath said edge having corrugations parallel to the edge, means for moving said edge relative to said form in a direction transverse to said corrugations, at a speed slower than said predetermined speed, and means including an element having a fixed position relative to said edge for urging a portion of the sheet at a constant distance from said edge into uniform contact with said form.

WILLIAM HOLDSWORTH ROOKSBY.
HERBERT HOMER.
THOMAS BURGESS.

REFERENCES CITED

The following references are of record in the file of this patent:

UNITED STATES PATENTS

| Number | Name | Date |
|---|---|---|
| 1,324,850 | Roberts | Dec. 16, 1919 |
| 1,450,222 | Pattison | Apr. 3, 1923 |
| 2,352,957 | Kell | July 4, 1944 |
| 2,377,849 | Binkert et al. | June 12, 1945 |

FOREIGN PATENTS

| Number | Country | Date |
|---|---|---|
| 585,154 | France | Dec. 3, 1924 |